US008982887B2

(12) United States Patent
Curtis et al.

(10) Patent No.: US 8,982,887 B2
(45) Date of Patent: Mar. 17, 2015

(54) SYSTEM, METHOD AND PROGRAM FOR MAKING ROUTING DECISIONS

(75) Inventors: Richard Scott Curtis, Parker, CO (US); Jason Davis Forrester, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 1317 days.

(21) Appl. No.: 11/750,727

(22) Filed: May 18, 2007

(65) Prior Publication Data

US 2008/0285560 A1 Nov. 20, 2008

(51) Int. Cl.
| H04L 12/28 | (2006.01) |
| H04J 3/16 | (2006.01) |
| H04L 12/701 | (2013.01) |
| H04L 12/721 | (2013.01) |
| H04L 12/727 | (2013.01) |
| H04L 12/733 | (2013.01) |
| H04L 12/725 | (2013.01) |

(52) U.S. Cl.
CPC ............... *H04L 45/00* (2013.01); *H04L 45/12* (2013.01); *H04L 45/121* (2013.01); *H04L 45/122* (2013.01); *H04L 45/308* (2013.01)
USPC ...... 370/392; 370/393; 370/395.31; 370/401; 370/469

(58) Field of Classification Search
None
See application file for complete search history.

(56) References Cited

U.S. PATENT DOCUMENTS

| 5,712,907 | A | * | 1/1998 | Wegner et al. ............ 379/114.02 |
| 5,987,011 | A | * | 11/1999 | Toh ............................... 370/331 |
| 6,259,673 | B1 | * | 7/2001 | Yoshihara et al. ............ 370/238 |
| 6,381,242 | B1 | | 4/2002 | Maher, III et al. |
| 6,597,684 | B1 | * | 7/2003 | Gulati et al. .................. 370/351 |
| 6,654,373 | B1 | | 11/2003 | Maher, III et al. |
| 7,075,927 | B2 | * | 7/2006 | Mo et al. ....................... 370/389 |
| 7,471,669 | B1 | * | 12/2008 | Sabesan et al. ............... 370/351 |
| 7,483,379 | B2 | * | 1/2009 | Kan et al. ...................... 370/237 |
| 2002/0105910 | A1 | | 8/2002 | Maher, III et al. |
| 2003/0099237 | A1 | * | 5/2003 | Mitra et al. ................... 370/393 |
| 2003/0169749 | A1 | * | 9/2003 | Huang et al. .................. 370/401 |
| 2003/0202536 | A1 | * | 10/2003 | Foster et al. .................. 370/469 |
| 2003/0214948 | A1 | * | 11/2003 | Jin et al. ........................ 370/392 |

(Continued)

FOREIGN PATENT DOCUMENTS

| EP | 1786151 A2 | 5/2007 |
| WO | 02088981 A1 | 11/2002 |
| WO | 03088586 A1 | 10/2003 |

OTHER PUBLICATIONS

Notification of Transmittal of the International Search Report and the Written Opinion of the International Searching Authority or the Declaration.

*Primary Examiner* — John Blanton
*Assistant Examiner* — Thinh Tran
(74) *Attorney, Agent, or Firm* — Schmeiser, Olsen & Watts, LLP; William E. Schiesser

(57) ABSTRACT

A computer system, method and program for routing. A router receives a message packet, and in response, the router reads a payload in the message packet to identify an application that sent the message packet or a user of the application that sent the message packet, as identified from the reading of the payload. The router determines a routing path for the message packet based at least in part on the identity of the application that sent the message packet or the user of the application that sent the message packet. The router forwards the message packet to a next hop in the routing path which was determined.

8 Claims, 3 Drawing Sheets

(56) References Cited

U.S. PATENT DOCUMENTS

| | | |
|---|---|---|
| 2004/0064537 A1 | 4/2004 | Anderson et al. |
| 2004/0076155 A1* | 4/2004 | Yajnik et al. .................. 370/389 |
| 2004/0240446 A1 | 12/2004 | Compton |
| 2005/0004916 A1 | 1/2005 | Miller et al. |
| 2005/0044221 A1* | 2/2005 | Venkatanarayan et al. ... 709/225 |
| 2005/0060295 A1 | 3/2005 | Gould et al. |
| 2005/0144311 A1 | 6/2005 | Ban |
| 2006/0227758 A1* | 10/2006 | Rana et al. ..................... 370/351 |
| 2007/0028002 A1 | 2/2007 | McCanne |
| 2007/0061445 A1 | 3/2007 | Deganaro |
| 2007/0064697 A1* | 3/2007 | Nesbitt et al. ................. 370/392 |
| 2008/0101368 A1* | 5/2008 | Weinman ..................... 370/392 |

\* cited by examiner

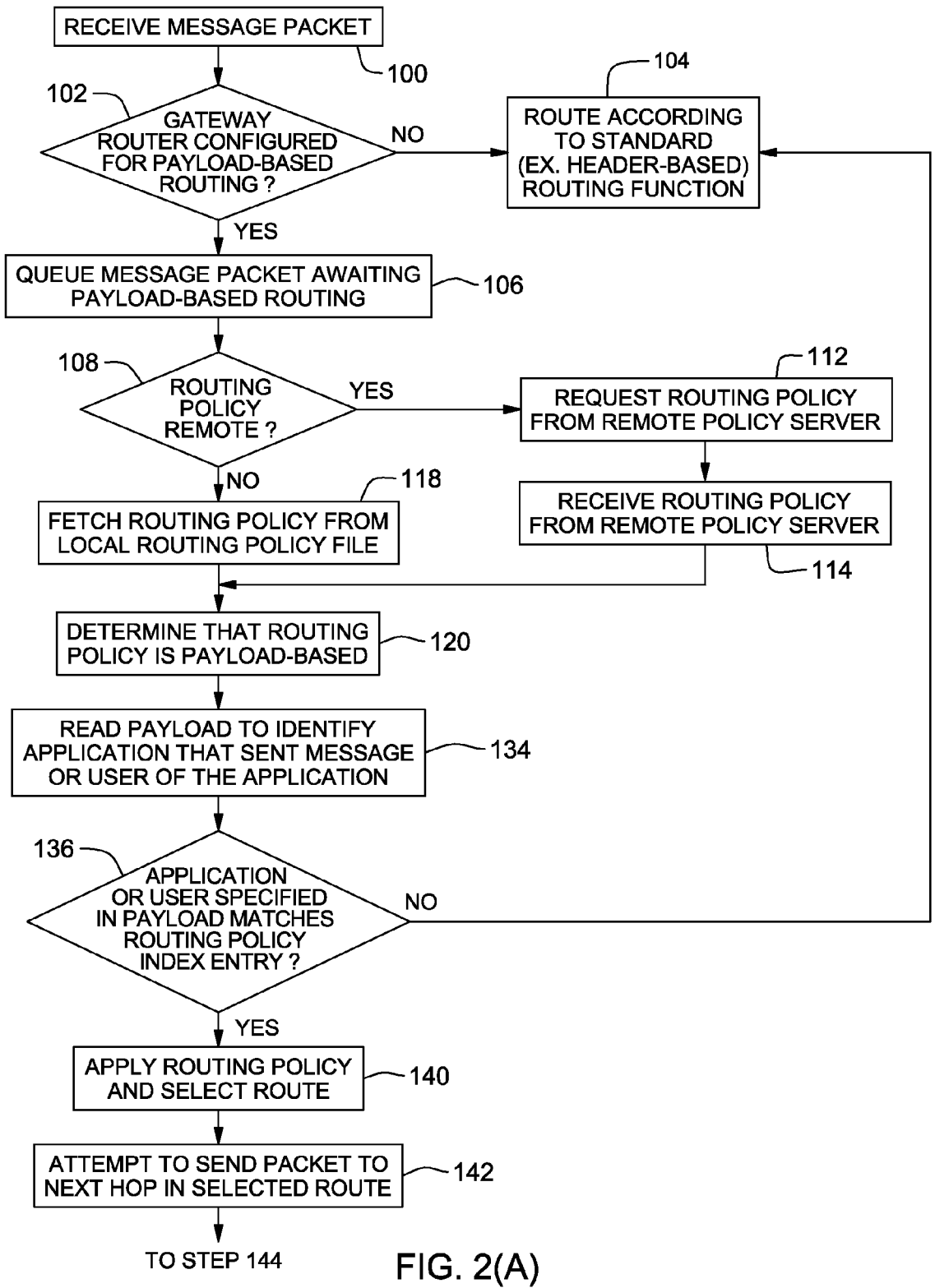

SYSTEM, METHOD AND PROGRAM FOR MAKING ROUTING DECISIONS

FIELD OF THE INVENTION

The present invention relates generally to network routing, and more specifically to routing decision technology.

BACKGROUND OF THE INVENTION

Computer networks such as the Internet are well known today. Such networks include communication media, firewalls, routers, network switches and hubs. Networks often interconnect client computers and servers. In the case of communications through the Internet and wide area networks, typically there are many routers and many possible routing paths between a source computer and a destination device (for example, a destination computer or gateway to a subnet) via the Internet. When a message arrives at a router, the router makes a decision as to the next router or "hop" in a path to the destination device. There are many known algorithms for making this decision, such as OSPF, RIP, IGRP, EIGRP, ISIS or BGP. The RIP, OSPF and ISIS protocols attempt to route message packets to a destination via the shortest path, i.e. fewest number of intervening routers. Routers using the OSPF protocol also can determine the bandwidth of the path to the next hop based on the interface used for forwarding the message packet to the next hop. The IGRP and EIGRP protocols attempt to route message packets based on greatest bandwidth, shortest delays and shortest path factors. The BGP protocol attempts to route message packets based on shortest Autonomous System path (i.e. fewest number of routers within a single administrative control) and least multi-exit discriminator ("MED") (i.e. a preference for one route over another that is advertised to neighboring routers).

Quality of Service ("QoS") may also be a factor in determining an optimum network path. QoS of a route or link in a route can be based on many factors including (a) the bandwidth of each link, (b) a routing queue which is used to determine the priority of processing and forwarding the message packet, and (c) specification of maximum latency or wait of the message packet within a router before forwarding to the next hop. Most routers have more than one routing queue with different priorities for each queue. For example, message packets on a higher priority routing queue are processed and forwarded before message packets on a lower priority routing queue. Some messages or bulk data transfers may need or warrant greater network bandwidth than others. This may result from a specification of QoS in a contract between a customer (who is sending the message or bulk data) and a service provider which is furnishing or managing part or all of the network which is used for the transmission.

US Published Patent Application 2002/0105910 discloses that the contents of any or all data packets are compared to a database of known signatures and if the contents of a data packet or packets, match a known signature, an action associated with that signature and/or session ID can be taken by network apparatus. Additionally, a content processor is operable to maintain state awareness throughout each individual traffic flow. In other words, a content processor maintains a database of each session which stores state information related to the current data packets from a traffic flow as well as state information related to the entirety of the traffic flow. This allows network apparatus to act based on the content of the data packets being scanned as well as the content of the entire traffic flow. Once the contents of the packets have been scanned and a conclusion reached by traffic flow scanning engine, the packets and the associated conclusions of either or both the header preprocessor and the content processor are sent to a quality of service (QoS) processor. The QoS processor again stores the packets in its own packet storage memory for forwarding. The QoS processor is operable to perform the traffic flow management for the stream of data packets processed by network apparatus. The QoS processor contains engines for traffic management, traffic shaping and packet modification. The QoS processor takes the conclusion of either or both of a header preprocessor and a content processor and assigns the data packet to one of its internal quality of service queues based on the conclusion. The quality of service queues can be assigned priority relative to one another or can be assigned a maximum or minimum percentage of the traffic flow through the device. This allows QoS processor to assign the necessary bandwidth to traffic flows such as VoIP, video and other flows, with high quality and reliability requirements while assigning remaining bandwidth to traffic flows with low quality requirements such as e-mail and general web surfing to low priority queues.

U.S. Pat. No. 6,654,373 discloses a traffic flow scanning processor which can be divided into a header processor and a payload analyzer. The header processor is capable of scanning the header information, determining routing requirements based on the header information and creating a unique session ID based on predetermined attributes of the data packet for identifying each individual active traffic flow within the network apparatus. The payload analyzer scans the contents of a data packet's payload and attempts to match the payload contents against a database of known strings. If a match is detected in the payload analyzer, the network apparatus is operable to perform a variety of programmable functions on the data packet or on the particular traffic flow to which the data packet is associated. In addition, the traffic flow scanning processor is able to maintain state awareness across each individual traffic flow. In addition to the traffic flow scanning processor, the network apparatus includes a quality of service processor. The quality of service processor is connected to the traffic flow scanning engine and receives the scanned data packets along with one or more conclusion or instructions from the scanning engine associated with each data packet. The quality of service processor is then operable to place each data packet into one of a plurality of quality of service queues according to the associated conclusions. The quality of service queue determines the priority of the associated data for transmission back onto the network. A routing network apparatus can be constructed using two or more route engine cards connected through a switch fabric and controlled by a management card. Each of the route engine cards includes a traffic flow scanning engine and at least one quality of service processor. The traffic flow scanning engine scans any or all of the data packets and develops an instruction or conclusion based on the contents of the data packet and maintains a state awareness across each individual traffic flow. The quality of service processor then places the data packet into a quality of service queue and modifies the packet as required for routing, quality, or security purposes. The quality of service processor then sends the data packet to the switch fabric which routes the data packets to the route engine card associated with its physical egress port. The quality of service processor on the egress route engine card acts as a buffer between the switch fabric and the physical egress ports and allocates access to the physical egress ports based on packet priority. The network apparatus has the ability to scan the contents of any data packet or packets for any information that can be represented as a signature or series of signatures. The signatures can be of any arbitrary length, can begin and end anywhere within the packets and can cross packet boundaries. Further, the network apparatus is able to maintain state awareness throughout all of the individual traffic flow by storing state information for each traffic flow representing any or all signatures matched during the course of that traffic flow.

U.S. Pat. No. 6,732,273 discloses that a sender of a message generates a message characterization code and attaches it to each message packet, apart from the body of the message packet. When a router receives the message packet, it reads the message characterization code. If the code indicates that the message requires secure communication (typically if the data in the payload is sensitive and not encrypted), then the router propagates the message packet in a secure manner such as by encryption or other secure path. However, if the code indicates that the message is not sensitive (typically if the data in the payload is not sensitive, or is sensitive but encrypted), then the router propagates the message packet along the shortest path, typically through the nonsecure Internet.

An object of the present invention is to enable a network device such as a router to determine a proper routing path for a message.

Another object of the present invention is to enable a network device such as a router to determine a proper routing path for a message without requiring any changes to the message packet format or content.

SUMMARY OF THE INVENTION

The present invention resides in a computer system, method and program for routing. A router receives a message packet, and in response, the router reads a payload in the message packet to identify an application that sent the message packet or a user of the application that sent the message packet. The router determines a routing path for the message packet based at least in part on the identity of the application that sent the message packet or the user of the application that sent the message packet, as identified from the reading of the payload. The router forwards the message packet to a next hop in the routing path which was determined.

According to a feature of the present invention, the router determines a minimum quality of service or bandwidth associated with the application that sent the message packet or the user of the application that sent the message packet. The router determines the routing path based at least in part on the minimum quality of service or bandwidth.

According to another feature of the present invention, the router queries a header-based routing function for identification of a multiplicity of next hops in a respective multiplicity of routes having fewest numbers of hops from the router to a destination IP address specified in a header of the message packet. The router selects one of the multiplicity of next hops in a respective one of the multiplicity of routes that meets the minimum quality of service or bandwidth associated with the application that sent the message packet or user of the application that sent the message packet.

According to another feature of the present invention, the router queries a header-based routing function for identification of a next hop router in a route that has a highest bandwidth of all routes leading from the router to the destination IP address specified in the header of the message packet. The router inserts into the header of the message packet a specification of a routing queue priority or maximum latency of the message packet within the next hop router to meet the minimum quality of service or bandwidth associated with the application that sent the message packet or user of the application that sent the message packet.

BRIEF DESCRIPTION OF THE FIGURES

FIGS. 2(A) and 2(B) form a flow chart of a payload-based routing function, implemented in hardware and/or software, within the gateway device of FIG. 1.

DETAILED DESCRIPTION OF THE PREFERRED EMBODIMENT

Figure 1:
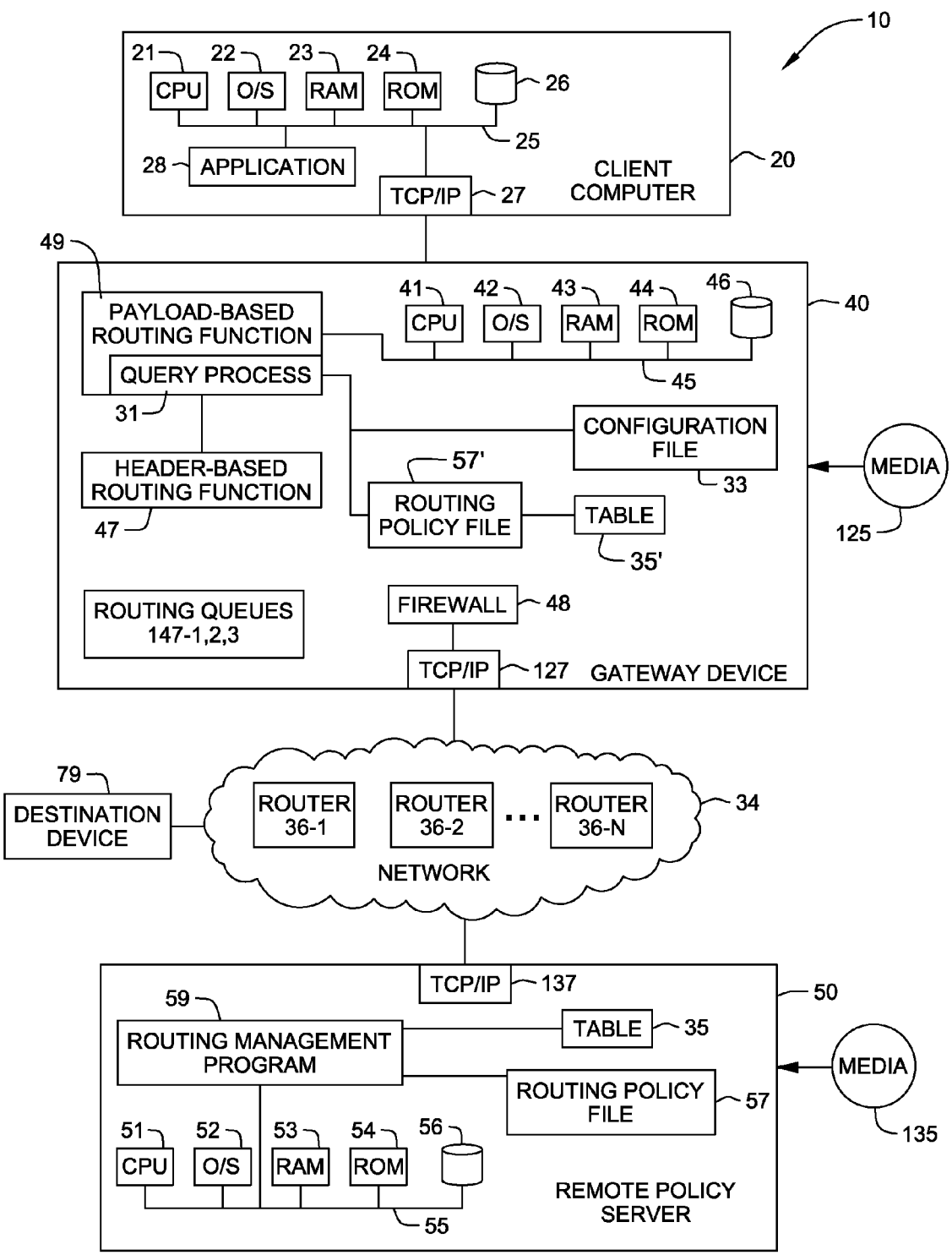
FIG. 1 is a block diagram of a distributed computer system including a network gateway device which embodies the present invention.

The present invention will now be described in detail with reference to the figures. FIG. 1 illustrates a distributed computer system generally designated 10 in which the present invention is embodied. System 10 comprises a client computer 20 and a gateway device 40 to interface to a public or private network 34 (such as the public Internet). Network 34 includes a multiplicity of routers, such as network routers 36-1, 36-2, 36-N, to forward message packets from client computer 20 (via gateway 40) to a destination device 79 (for example, a destination computer or a gateway device to a subnet of the destination computer), and vice versa. Client computer 20 can be a workstation or server (for example, a web server, production server, etc.) and includes a known CPU 21, operating system 22, RAM 23 and ROM 24 on a common bus 25 and storage 26. Gateway device 40 includes a known CPU 41, operating system 42, RAM 43 and ROM 44 on a common bus 45 and storage 46. Gateway device 40 also includes a known firewall 48 and a known routing function 47 (embodied in hardware and/or software) such as OSPF, RIP, IGRP, EIGRP, ISIS or BGP routing function. In accordance with the present invention, gateway device 40 also includes a payload-based routing function 49, implemented in hardware and/or software, which identifies an application which sent the message or a UserID of a person (i.e. an individual or group of people) using the application which sent the message. Based on the application which sent the message or the UserID of the person using the application which sent the message and a local routing policy file 57' (or remote routing policy file 57), payload-based routing function 49 selects an appropriate routing path as described below. A remote policy server 50 comprises a known CPU 51, operating system 52, RAM 53 and ROM 54 on a common bus 55 and storage 56. Remote policy server 50 also includes a routing management program 59 and routing policy file 57 according to the present invention.

In a typical scenario, an application 28 in client computer 20 generates a message and a TCP/IP adapter card 27 within client computer 20 packetizes the messages according to the OSI model, and forwards the message packets to gateway device 40. Each of the message packets includes a header with a source IP address, a destination IP address, source port number and destination port number. The destination device can be device 79. Each of the message packets also includes a payload, separate from the header, containing data. Some of the message packet payloads identify an application which sent the message packet and/or a UserID of a person using the application which sent the message packet. Upon receipt of each message packet at gateway device 40, payload-based routing function 49 in conjunction with known routing function 47 (for example, OSPF, RIP, IGRP, EIGRP, ISIS or BGP) can determine the next hop to forward the message packet and other QoS control factors, as follows. Upon receipt of a message packet, payload-based routing function 49 parses the payload to identify the application that sent the message packet or the UserID of a person using the application that sent the message. Next, payload-based routing function 49 determines a routing policy corresponding to the application that sent the message packet or the UserID of a person using the application that sent the message. For example, the routing policy may require a specified quality of service ("QoS") to be used for transmission of the message packets, based on an identity of the application that sent the message packet or the UserID of the person which used the application which sent the message packet. The specified QoS indicates that the packet should arrive at its destination within a specified time based on network bandwidth, and/or priority of the packets over other packets, and/or maximum latency that will be tolerated for the packets, etc. For example, some applications or UserIDs warrant higher quality of service ("QoS"), i.e. faster delivery, than others. The routing policy can also specify other routing requirements based on the application that sent the message packet or the UserID that used the application that sent the message packet, for example, (a) a security requirement (i.e. that the message packet should be sent along a secure network such as a VPN), or (b) a packet duplication requirement (i.e. that the message packet should be sent to an archive network as well as destination IP address. Next, payload-based routing function 49 selects a route or controls QoS in any of at least three different ways:

1. For some destination IP addresses, there is an entry in a table 35 and 35' (provided earlier by an administrator) which indicates various routes to the respective destination IP addresses and the respective QoS, bandwidth or other routing performance characteristics for the routes. If the destination IP address in the message packet header matches one of these destination IP addresses, the payload-based routing function selects one of the routes in the table that meets the routing policy (for example, QoS, bandwidth, etc.) for the application that sent the message or the UserID of the person that used the application that sent the message, and forwards the message packet to the next hop along this route.

2. The payload-based routing function 49 queries the header-based routing function 47 for the best N routes (for example, the ten routes with the fewest number of hops in OSPF, IGRP and EIGRP routing) in order of preference as determined by the header-based routing function, that lead to the destination IP address specified in the message packet header along with an indication of the bandwidth for each such route. As explained above, the QoS of a route or link in a route is based on many factors including the bandwidth of each link. Next, the payload routing function 49 selects the best one of these N routes that meets the routing policy (for example, the specified QoS) corresponding to the application that sent the message or UserID of the person using the application which sent the message. Next, the payload-based routing function 49 forwards the message packet to the next hop along the selected route.

3. The payload-based routing function 49 queries the header-based routing function 47 for the (single) best route that leads to the destination IP address along with an indication of the best route's bandwidth. As explained above, the QoS of a route or link in a route is based on many factors including a routing queue which is used in each router or specification of maximum latency or wait of the message packet within each router before being forwarded to the next hop. Most routers have more than one routing queue with different priorities for each queue. For example, message packets on a higher priority routing queue are processed and forwarded before message packets on a lower priority routing queue. If the bandwidth of the best route can provide the requisite QoS (for the application which sent the message packet or the UserID of the person which used the application which sent the message packet) for message packets on one (or more) of the routing queues or with a realizable specified maximum latency, then the payload-based routing function 49 accepts the best route identified by the header-base routing function 47 and selects the proper one of the queues 147-1, 2 or 3 to process the current message packet and all other message packets of the same message and includes in the header of the message packet a specification of the requisite routing queue or maximum latency.

Preferably, all routers in the selected route include a payload-based routing function similar to payload-based routing function 49, such that each downstream router in the selected route properly selects the next hop (and routing queue and maximum latency, if needed) to meet the packet-based routing policy for the application that sent the message packet or the UserID of the person that used the application that sent the message. Each router which receives the message packet will know which other, adjacent routers include a payload-based routing function by periodically broadcasting a query on a specified port and listening for a response from adjacent routers indicating that they include a payload-based routing function such as function 49 (process 31 of FIG. 1). If the next hop router in the selected path does not include a payload-based routing function such as function 49, then the current hop router can (1) broadcast to the next hop router the route that the current hop router has selected for the destination IP address in the message packet so that the next hop router will adopt this route as the best route to the destination IP address, or (2) include with the message packet a specification of QoS or other routing criteria so the next hop router can select one of its routing queues or maximum latency to meet this routing criteria. In the former case (1), after the complete message is sent, the current hop router can rebroadcast to its adjacent routers the routes based on the known routing function (for example, OSPF, RIP, IGRP, EIGRP, ISIS or BGP) so that the next message packet will be routed based on the standard routing function (irrespective of the application that sent the message packet or the UserID of the application that sent the message packet) unless the next message packet includes identification of an application that sent the message packet or the UserID of the application that sent the message packet, and there is a routing policy for such application or UserID.

The message packets proceed in a similar manner from the next hop router via other routers to the destination device in the manner described above.

Figure 2B:
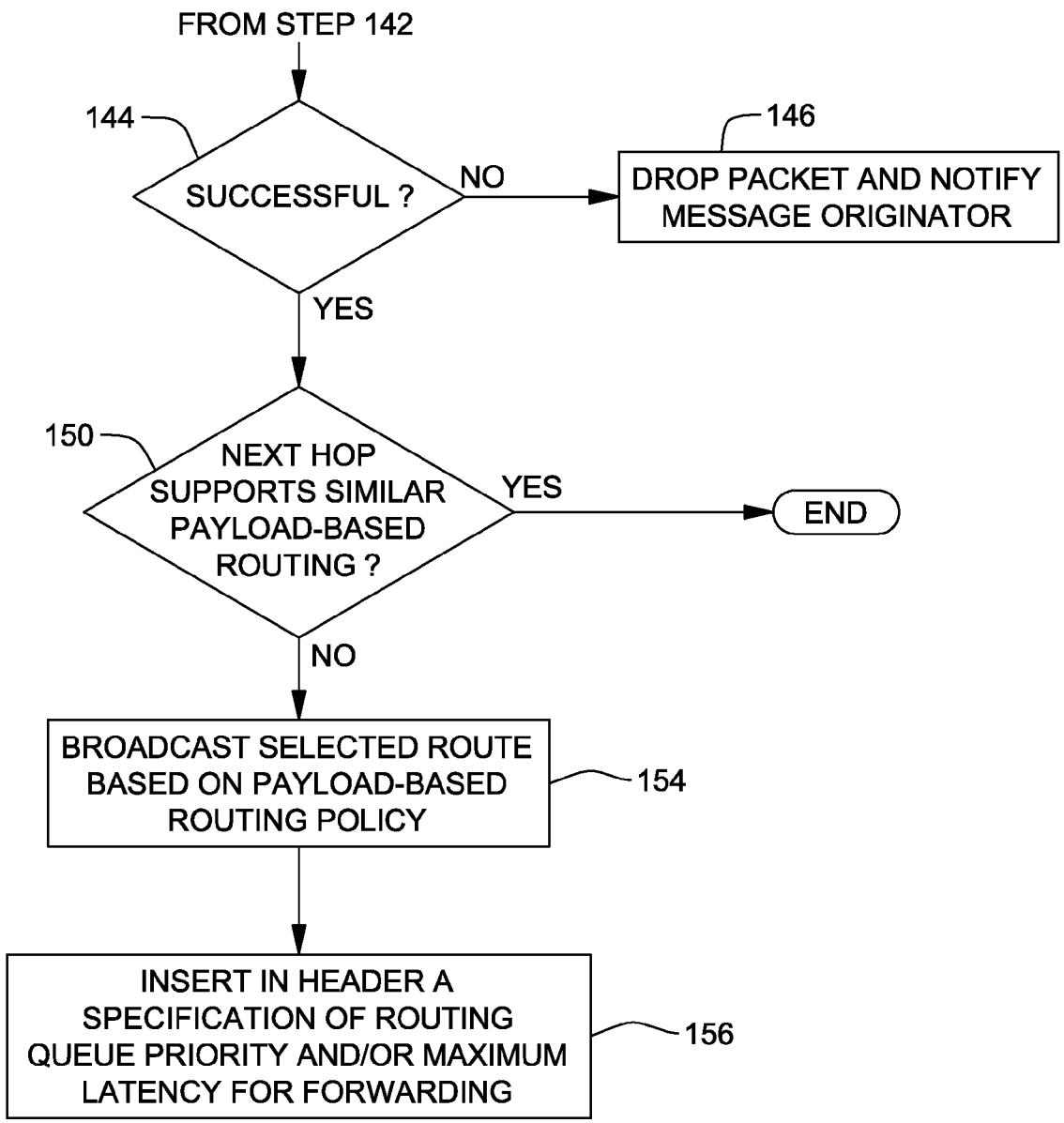

FIGS. 2(A) and 2(B) illustrate the function and implementation of payload-based routing function 49 in gateway device 40 in more detail. In step 100, gateway device 40 receives a message packet from client computer 20. In response, function 49 determines from a configuration file 33 if gateway device 40 is currently configured to route message packets based in part on the application that sent the message packet or UserID of the person (individual or group) that used the application that sent the message packets (decision 102). If not (decision 102, no branch), then function 49 invokes routing function 47 to determine the next hop router, based on a standard routing algorithm such as OSPF, RIP, IGRP, EIGRP, ISIS or BGP) (step 104). However, if gateway device 40 is currently configured to route message packets based in part on the application that sent the message packet or the UserID of the person that used the application that sent the message packets (decision 102, yes branch), then function 49 queues the newly arrived message packet awaiting processing to determine the next hop (106). Next, function 49 determines if the routing policy for message packets is stored in gateway device 40 or stored remotely, such as in remote routing policy server 50 (decision 108). If the routing policy is stored in remote routing policy server 50 (decision 108, yes branch), then function 49 requests the routing policy file 57 from a routing management program 59 in remote policy server 50 (step 112). The remote policy server 50 fetches the routing policy from its routing policy file 57, and returns it to gateway device 40 (step 114). Refer again to decision 108, no branch, where the routing policy is maintained locally, function 49 fetches the routing policy from local routing policy file 57' within gateway device 40 (step 118). By way of example, the routing policy (fetched from either the remote policy server 50 or from the local policy file 57') can state the following:

Example of Routing Policy

| Payload Content Sending Application or UserID | QoS Routing Requirement | Other Routing Requirement |
|---|---|---|
| UserID ABC | Minimum QoS = X | None |
| UserID CDE | Minimum QoS = Y | Copy to Archive Device |
| UserID FGH | No Minimum QoS | None |
| UserID IJK | Minimum Bandwidth = Z | None |
| Source Application LMN | Minimum QoS = Y | None |
| Source Application OPQ | Minimum Bandwidth = W | None |
| Source Application RST | Minimum QoS = X | Secure route |

After obtaining the routing policy from either remote policy file 57 or from local policy file 57', and determining that the routing policy is based on the application that sent the message packet or the user of the application that sent the message packet (step 120), function 49 parses and reads the payload fields of the message packet to identify the routing policy factors, such as the identity of the application that sent the message packet or the UserID of the person who used the application that sent the message packet (step 134). By way of example, the identity of the application that sent the message packet may be listed in the user name field pursuant to the SMB protocol, and the identity of the UserID that used the application that sent the message packet may be listed in the user name field pursuant to the to the Radius protocol. If none of the fields in the message packet matches any of the routing policy factors in the routing policy (i.e. either there is no application or UserID listed in the payload, or the application or UserID which is listed in the payload does not match any entry key in the routing policy) (decision 136, no branch), then function 49 routes the packet according to the known OSPF, RIP, IGRP, EIGRP, ISIS or BGP algorithm as determined by routing function 47 (step 137). However, if any of the fields in the payload matches an entry key (i.e. an entry in the first column) of a routing policy factor in the routing policy (decision 136, yes branch), then function 49 reads the corresponding routing requirement(s) from the routing policy file, and applies it (step 140). In the foregoing example, if UserID "ABC" sent the message packet and this UserID is listed in the message packet payload, then the routing policy requirement specifies a minimum QoS of "X" (and no other routing policy requirements). Also, in the foregoing example, if source application "LMN" sent the message packet and this UserID is listed in the message packet payload, then the routing policy requirement specifies a minimum QoS of "Y" (and no other routing policy requirements). Also, in the foregoing example, if UserID "CDE" sent the message packet and this UserID is listed in the message packet payload, then the routing policy requirement specifies a minimum QoS of "Y" (and that a copy of the message packet is sent to an archive device). Also, in the foregoing example, if UserID "RST" sent the message packet and this UserID is listed in the message packet payload, then the routing policy requirement specifies a minimum QoS of "X" (and the message packet must be sent over a secure route). In step 140, routing function 49 determines a route that meets the routing policy requirement in any of the three ways specified above or other appropriate ways:

1. For some destination IP addresses, there is an entry in a table 35 and 35' (provided earlier by an administrator) which indicates various routes to the respective destination IP addresses and the respective QoS or other routing performance characteristics for the routes. If the destination IP address in the message packet header matches one of these destination IP addresses, the payload-based routing function selects one of the routes in the table that meets the routing policy (for example, QoS, bandwidth, etc.) for the application that sent the message or the UserID of the person that used the application that sent the message, and forwards the message packet to the next hop along this route.

2. The payload-based routing function 49 queries the header-based routing function 47 for the best N routes (for example, the ten routes with the fewest number of hops in OSPF, IGRP and EIGRP routing) in order of preference as determined by the header-based routing function, that lead to the destination IP address specified in the message packet header along with an indication of the bandwidth for each such route. As explained above, the QoS of a route or link in a route is based on many factors including the bandwidth of each link. Next, the payload routing function 49 selects the best one of these N routes identified by the header-based routing function 47 that meets the routing policy (for example, the specified QoS) corresponding to the application that sent the message or UserID of the person using the application which sent the message. Next, the payload-based routing function 49 forwards the message packet to the next hop along the selected route.

3. The payload-based routing function 49 queries the header-based routing function 47 for the (single) best route that leads to the destination IP address along with an indication of the best route's bandwidth. As explained above, the QoS of a route or link in a route is based on many factors including a routing queue which is used in each router or specification of maximum latency or wait of the message packet within each router before being forwarded a message packet to the next hop. Most routers have more than one routing queue with different priorities for each queue. For example, message packets on a higher priority routing queue are processed and forwarded before message packets on a lower priority routing queue. If the bandwidth of the best route can provide the requisite QoS (for the application which sent the message packet or the UserID of the person which used the application which sent the message packet) for message packets on one (or more) of the routing queues or with a realizable specified maximum latency, then the payload-based routing function 49 accepts the best route identified by the header-based routing function 47 and selects the proper one of the queues 147-1, 2 or 3 to process the current message packet and all other message packets of the same message. Next, the payload-based routing function 49 forwards the message packet to the next hop along the selected route and includes in the header of the message packet a specification of the requisite routing queue or maximum latency.

Next, function 49 attempts to forward the message packet to the next hop router which was identified in step 140 (based on the routing policy and available routes) (step 142). If function 49 is unsuccessful in forwarding the message packet (in one or more tries) (decision 144, no branch), then function 49 "drops" the message packet and notifies the originator (source IP address) of the dropped message packet so the originator can decide whether to re-send the message packet (step 146). However, if function 49 successfully forwards the message packet (decision 144, yes branch), then function 49 determines if the next hop router includes a function like function 49 to route the message packet based on the foregoing routing policy for the application that sent the message packet or the UserID of the person who used the application which sent the message packet (decision 150). Periodically such as every hour, function 49 and a program function similar to function 49 in each router that supports the foregoing routing policy broadcasts a query on a specified port and listens for a response from adjacent routers indicating that they include a payload-based routing function similar to function 49. Preferably, all routers in the selected route include a payload-based routing function similar to payload-based routing function 49, such that each downstream router in the selected route properly selects the next hop (and routing queue and maximum latency, if needed) to meet the packet-based routing policy for the application that sent the message packet or the UserID of person that used the application that sent the message packet. If the next hop router in the selected path includes a payload-based routing function (decision 150, yes branch), then function 49 assumes that the next hop router will further route the message packet according to the routing policy, and therefore, function 49 concludes its processing of this message packet. However, if the next hop router in the selected path does not include a payload-based routing function (i.e. did not respond to the query on the specified port to indicate a resident payload-based routing function) (decision 150, no branch), then function 49 can (1) broadcast to the next hop router the route that gateway device 40 router has selected for the destination IP address in the message packet so that the next hop router will adopt this route as the best route to the destination IP address for this message packet (step 154), and/or (2) include with the message packet a specification of QoS or other routing criteria so the next hop router (and subsequent routers en route to the destination IP address) can select one of its routing queues or maximum latency to meet this routing criteria (step 156). In the former case (1), after the complete message is sent, gateway device 40 can rebroadcast to its adjacent routers the routes based on the standard routing function (for example, OSPF, RIP, IGRP, EIGRP, ISIS or BGP) so that the next message packet will be routed based on the standard routing function unless the next message packet includes identification of an application that sent the message packet or the UserID of the application that sent the message packet, and there is a routing policy for such application or UserID (steps 120-140).

The functions 47 and 49 of gateway device 40 illustrated in FIG. 2 can be implemented in hardware and/or software. To the extent the functions 47 and 49 are implemented in software, they can be loaded into gateway device 40 from a computer readable media 125 such as magnetic tape or disk, optical media, DVD, semiconductor media, memory stick, etc. or downloaded from the Internet via TCP/IP adapter card 127.

The function 59 of server 50 illustrated in FIG. 1 can be implemented in hardware and/or software. To the extent the function 59 is implemented in software, it can be loaded into gateway device 40 from a computer readable media 135 such as magnetic tape or disk, optical media, DVD, semiconductor media, memory stick, etc. or downloaded from the Internet via TCP/IP adapter card 137.

Based on the foregoing, a system, method and program product for making routing decisions have been disclosed. However, numerous modifications and substitutions can be made without deviating from the scope of the present invention. For example, Quality of Service ("QoS") information or other preferential routing treatment can be applied based on encryption state. Therefore, the present invention has been disclosed by way of illustration and not limitation, and reference should be made to the following claims to determine the scope of the present invention.

What is claimed is:
1. A method for routing, the method comprising:
a first router receiving a message packet sent by a message sender;
after said receiving the message packet, a first payload-based routing function of the first router receiving a routing policy specifying an identity of each message entity of a plurality of message entities and specifying at least one routing requirement for each message entity, each message entity comprising an application;
after said receiving the routing policy, the first payload-based routing function of the first router reading a payload in the message packet;
in response to said reading the payload, the first payload-based routing function of the first router determining that a first message entity of the plurality of message entities specified in the routing policy, said first message entity comprising the application that sent the message packet;
in response to a determination that the message sender is the first message entity, the first payload-based routing function of the first router queuing a header-based routing function of the first router for identification of a multiplicity of routes having a fewest numbers of hops from the first router to a destination IP address specified in a header of the message packet;
the first payload-based routing function of the first router determining a routing path as being one route of the multiplicity of routes that best satisfies the at least one routing requirement specified in the routing policy for the first message entity, the routing path comprising at least one other router disposed between the first router and a destination device for the message packet, said determining the routing path based at least in part on the identity of the first message entity;
in response to said determining the routing path, the first router forwarding the message packet to a next router of the at least one other router in the routing path;
determining whether the next router includes a second payload-based routing function;
if the determination is made that the next router does not include the second payload-based routing function, then the first payload-based routing function of the first router broadcasting to the next router a route that the first router has selected for the destination Internet Protocol (IP) address in the message packet, wherein the next router will adopt the route as a best route to the destination IP address; and
if the determination is made that the next router includes the second payload-based routing function, then the first payload-based routing function of the first router including with the message packet a specification of Quality of Service (QoS) or other routing criteria, wherein the next router selects one of the next router's routing queues or maximum latency to meet the QoS or other routing criteria.

2. The method of claim 1, wherein said receiving the routing policy comprises receiving the routing policy from a remote policy server located external to a gateway device that comprises the first router.

3. The method of claim 1, wherein said receiving the routing policy comprises fetching the routing policy from within a gateway device that comprises the first router.

4. The method of claim 1, wherein the at least one routing requirement comprises a security requirement that the routing path be with a secure network.

5. The method of claim 1, wherein the at least one routing requirement comprises a packet duplication requirement message packet be sent to both destination IP address and an archive device.

6. A computer program product for routing, said computer program product comprising:
    a computer readable tangible storage device; and
    program code stored in the computer readable tangible storage device, the program code comprising:
        first program instructions to receive, by a first router, a message packet sent by a message sender;
        second program instructions to receive, by a first payload-based routing function of the first router after the message packet is received, a routing policy specifying an identity of each message entity of a plurality of message entities and specifying at least one routing requirement for each message entity, each message entity comprising an application;
        third program instructions to read, by the first payload-based routing function of the first router after the routing policy is received, a payload in the message packet;
        fourth program instructions to determine, by the first payload-based routing function of the first router in response to the payload being read, that a first message entity of the plurality of message entities specified in the routing policy, said first message entity comprising the application that sent the message packet;
        fifth program instructions to query, by the first payload-based routing function of the first router in response to the determination that the message sender is the first message entity, a header-based routing function of the first router for identification of a multiplicity of routes having a fewest numbers of hops from the first router to a destination IP address specified in a header of the message packet;
        sixth program instructions to determine, by the payload-based routing function of the first router, a routing path as being one route of the multiplicity of routes that best satisfies the at least one routing requirement specified in the routing policy for the first message entity, the routing path comprising at least one other router disposed between the first router and a destination device for the message packet, said routing path being determined based at least in part on the identity of the first message entity;
        seventh program instructions to forward, by the first router in response to the routing path being determined, the message packet to a next router of the at least one other router in the routing path;
        eighth program instructions to determine whether the next router includes a second payload-based routing function;
        ninth program instructions to, by the first payload-based routing function of the first router if the determination is made that the next router does not include the second payload-based routing function, broadcast to the next router a route that the first router has selected for the destination Internet Protocol (IP) address in the message packet, wherein the next router will adopt the route as a best route to the destination IP address; and
        tenth program instructions to, by the first payload-based routing function of the first router if the determination is made that the next router includes the second payload-based routing function, include with the message packet a specification of Quality of Service (QoS) or other routing criteria, wherein the next router selects one of the next router's routing queues or maximum latency to meet the QoS or other routing criteria.

7. A system for routing, said system comprising:
    a processor;
    a computer readable memory;
    a computer readable tangible storage device;
    program code stored on the computer readable tangible storage device for execution by the processor via the computer readable memory, the code comprising:
        first program instructions to receive, by a first router, a message packet;
        second program instructions to receive, by a first payload-based routing function of the first router after the message packet is received, a routing policy specifying an identity of each user of a plurality of users and specifying at least one routing requirement for each user identified in the routing policy;
        third program instructions to read, by the first payload-based routing function of the first router after the routing policy is received, a payload in the message packet to identify a user of an application that sent the message packet;
        fourth program instructions to determine, by the first payload-based routing function of the first router in response to the payload being read, that the user of the application that sent said message packet is a first user of the plurality of users specified in the routing policy;
        fifth program instructions to query, by the first payload-based routing function of the first router in response to the determination that the user of the application that sent said message packet is the first user, a header-based routing function of the first router for identification of a multiplicity of routes having a fewest numbers of hops from the first router to a destination IP address specified in a header of the message packet;
        sixth program instructions to determine, by the first payload-based routing function of the first router, a routing path as being one route of the multiplicity of routes that best satisfies the at least one routing requirement specified in the routing policy for the first user, the routing path comprising at least one other router disposed between the first router and a destination device for the message packet, said routing path being determined based at least in part on the identity of the first user;
        seventh program instructions to forward, by the first router in response to the routing path being determined, the message packet to a next router of the at least one other router in the routing path;
        eighth program instructions to determine whether the next router includes a second payload-based routing function;
        ninth program instructions to, by the first payload-based routing function of the first router if the determination is made that the next router does not include the second payload-based routing function, broadcast to the next router a route that the first router has selected for the destination Internet Protocol (IP) address in the message packet, wherein the next router will adopt the route as a best route to the destination IP address; and tenth program instructions to, by the first payload-based routing function of the first router if the determination is made that the next router includes the second payload-based routing function, include with the message packet a specification of Quality of Service (QoS) or other routing criteria, wherein the next router selects one of the next router's routing queues or maximum latency to meet the QoS or other routing criteria.

8. A method for routing, the method comprising:

a first router receiving a message packet;

after said receiving the message packet, a first payload-based routing function of the first router receiving a routing policy specifying an identity of each user of a plurality of users and specifying at least one routing requirement for each user specified in the routing policy;

after said receiving the routing policy, the first payload-based routing function of the first router reading a payload in the message packet to identify a user of an application that sent the message packet;

in response to said reading the payload, the first payload-based routing function of the first router determining that the user of the application that sent the message packet is a first user of the plurality of users specified in the routing policy;

in response to said determining that the user of the application that sent the message packet is the first user, the first payload-based routing function of the first router querying a header-based routing function of the first router for identification of a multiplicity of routes having a fewest numbers of hops from the first router to a destination IP address specified in a header of the message packet;

the first payload-based routing function of the first router determining a routing path as being one route of the multiplicity of routes that best satisfies the at least one routing requirement specified in the routing policy for the first user, the routing path comprising at least one other router disposed between the first router and a destination device for the message packet, said determining the routing path based at least in part on the identity of the first user;

in response to said determining the routing path, the first router forwarding the message packet to a next router of the at least one other router in the routing path;

determining whether the next router includes a second payload-based routing function;

if the determination is made that the next router does not include the second payload-based routing function, then the first payload-based routing function of the first router broadcasting to the next router a route that the first router has selected for the destination Internet Protocol (IP) address in the message packet, wherein the next router will adopt the route as a best route to the destination IP address; and if the determination is made that the next router includes the second payload-based routing function, then the first payload-based routing function of the first router including with the message packet a specification of Quality of Service (QoS) or other routing criteria, wherein the next router selects one of the next router's routing queues or maximum latency to meet the QoS or other routing criteria.

\* \* \* \* \*